(12) United States Patent
Peng et al.

(10) Patent No.: US 12,706,830 B2
(45) Date of Patent: Aug. 11, 2026

(54) ROUTING ENTRY OBTAINING METHOD AND APPARATUS, AND DEVICE

(71) Applicant: Huawei Technologies Co., Ltd., Shenzhen (CN)

(72) Inventors: Shuping Peng, Beijing (CN); Lei Li, Beijing (CN); Zhenbin Li, Beijing (CN); Jianwu Hao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 644 days.

(21) Appl. No.: 17/588,594

(22) Filed: Jan. 31, 2022

(65) Prior Publication Data

US 2022/0158928 A1 May 19, 2022

Related U.S. Application Data

(63) Continuation of application No. PCT/CN2020/106496, filed on Aug. 3, 2020.

(30) Foreign Application Priority Data

Aug. 2, 2019 (CN) ........................ 201910713391.4

(51) Int. Cl.
*H04L 67/1019* (2022.01)
*G06F 9/46* (2006.01)
(Continued)

(52) U.S. Cl.
CPC .............. *H04L 45/04* (2013.01); *H04L 45/54* (2013.01); *H04L 45/70* (2013.01)

(58) Field of Classification Search
CPC ....... H04L 45/04; H04L 45/306; H04L 45/32; H04L 45/025; H04L 45/54; H04L 45/586;
(Continued)

(56) References Cited

U.S. PATENT DOCUMENTS 7,281,031 B1 * 10/2007 Wang .................. H04L 12/4625 709/213
9,565,114 B1 * 2/2017 Kabbani ............. H04L 45/7453
(Continued)

FOREIGN PATENT DOCUMENTS

CN 101151847 A 3/2008
CN 101414962 A * 4/2009
(Continued)

*Primary Examiner* — Edan Orgad
*Assistant Examiner* — Vanneilian Lalchinthang
(74) *Attorney, Agent, or Firm* — Conley Rose, P.C.

(57) ABSTRACT

A routing entry obtaining method and apparatus applied to a network device and includes obtaining an identifier of an application program, a computing capability of a first apparatus running the application program, and a computing capability of a second apparatus running the application program; and obtaining a routing entry based on the identifier of the application program, the computing capability of the first apparatus, and the computing capability of the second apparatus, wherein the routing entry comprises the identifier of the application program and an egress port, where the egress port is capable of communicating with a target apparatus determined according to the computing capability of the first apparatus and the computing capability of the second apparatus.

21 Claims, 5 Drawing Sheets

(51) Int. Cl.

| | |
|---|---|
| ***G06F 15/173*** | (2006.01) |
| ***H04L 12/803*** | (2013.01) |
| ***H04L 45/00*** | (2022.01) |
| ***H04L 45/02*** | (2022.01) |

(58) Field of Classification Search

CPC ....... H04L 45/70; H04L 67/1001; H04L 9/40; H04L 45/74; H04L 47/125; H04L 41/5003; H04L 43/065; H04L 43/20; G06F 15/16

USPC .......................................................... 370/389

See application file for complete search history.

(56) References Cited

U.S. PATENT DOCUMENTS

| | | | | |
|---|---|---|---|---|
| 10,326,655 | B1 * | 6/2019 | Sait | H04L 41/0846 |
| 2003/0072271 | A1 * | 4/2003 | Simmons | H04L 12/1868 370/255 |
| 2004/0268358 | A1 * | 12/2004 | Darling | H04L 67/1008 718/105 |
| 2006/0164995 | A1 * | 7/2006 | Djernaes | H04L 45/306 370/238 |
| 2006/0215577 | A1 * | 9/2006 | Guichard | H04L 45/50 370/254 |
| 2014/0244851 | A1 * | 8/2014 | Lee | H04L 45/54 709/228 |
| 2016/0164787 | A1 * | 6/2016 | Roach | H04L 43/20 370/235 |
| 2016/0352650 | A1 * | 12/2016 | Liu | H04L 41/344 |
| 2016/0381126 | A1 * | 12/2016 | Basavaiah | G06F 9/455 709/223 |
| 2017/0109339 | A1 * | 4/2017 | Jin | G06F 40/169 |
| 2017/0338976 | A1 * | 11/2017 | Wang | H04L 49/3009 |
| 2018/0048562 | A1 * | 2/2018 | Meyer | H04L 49/109 |
| 2018/0091420 | A1 * | 3/2018 | Drake | H04L 67/10 |
| 2018/0219783 | A1 * | 8/2018 | Pfister | H04L 67/1027 |
| 2018/0241692 | A1 | 8/2018 | Kumar | |
| 2018/0270720 | A1 | 9/2018 | Shi et al. | |
| 2018/0316520 | A1 * | 11/2018 | Wijnands | H04L 45/50 |

FOREIGN PATENT DOCUMENTS

| | | | | | |
|---|---|---|---|---|---|
| CN | 102611735 | A | | 7/2012 | |
| CN | 105991435 | A | | 10/2016 | |
| CN | 106101262 | A | | 11/2016 | |
| CN | 107592274 | A | | 1/2018 | |
| CN | 107612832 | A | | 1/2018 | |
| CN | 107872392 | A | | 4/2018 | |
| CN | 108028783 | A | | 5/2018 | |
| CN | 108737271 | A | | 11/2018 | |
| CN | 108768723 | A | * | 11/2018 | H04L 41/0803 |
| CN | 208849791 | U | | 5/2019 | |
| JP | 2012083160 | A | | 4/2012 | |
| KR | 100772924 | B1 | | 11/2007 | |

* cited by examiner

ROUTING ENTRY OBTAINING METHOD AND APPARATUS, AND DEVICE

CROSS-REFERENCE TO RELATED APPLICATIONS

This is a continuation of International Patent Application No. PCT/CN2020/106496 filed on Aug. 3, 2020, which claims priority to Chinese Patent Application No. 201910713391.4 filed on Aug. 2, 2019. The disclosures of the aforementioned applications are hereby incorporated by reference in their entireties.

TECHNICAL FIELD

This application relates to the network field, and in particular, to a routing entry obtaining method and apparatus, and a device.

BACKGROUND

An application program (APP), which is also referred to as application software (APP), is a computer program designated to carry out one or more specific tasks, and usually needs to interact with a user. The application program usually includes a client and a server side. The client is installed in a terminal device, and is configured to interact with the user. The server side is installed in a server, and is configured to respond to a request from the client, deliver software update content to the client, and the like.

In an existing technology, to enhance a computing capability of an application program, a plurality of instances of a server side of a same application program may be deployed in different apparatuses, and each apparatus may run one or more application program instances. Apparatuses running different application program instances of the same application program may have different computing capabilities. Because a computing capability of an apparatus directly affects user experience of a client of an application program, it is quite important to select an apparatus with an appropriate computing capability to respond to a request from the client of the application program.

SUMMARY

Embodiments of this application provide a routing entry obtaining method and apparatus, to provide a user with an apparatus with an appropriate computing capability to interact with a terminal device.

According to a first aspect, an embodiment of this application provides a routing entry obtaining method. The method may be applied to a first network device, and the first network device may be a router or a layer 3 switch. The method includes the following steps. First, the first network device obtains an identifier of an application program, a computing capability of a first apparatus running the application program, and a computing capability of a second apparatus running the application program. The first apparatus and the second apparatus each may be a virtual machine, a server, or a container. The computing capability of the first apparatus and the computing capability of the second apparatus include, for example, one or more of load, a quantity of central processing unit (CPU) cores, and a size of a random-access memory (RAM). This is not limited in this embodiment of this application. The identifier of the application program is used to identify the application program. For example, the identifier of the application program is a protocol characteristic string or an application attribute code of the application program. This is not limited in this embodiment of this application. Next, the first network device determines, based on the computing capability of the first apparatus and the computing capability of the second apparatus, an apparatus whose computing capability satisfies a preset condition as a target apparatus. Then, the first network device obtains an identifier of a target instance. The identifier of the target instance is used to identify an instance of the application program run by the target apparatus. Finally, the first network device generates a routing entry based on the identifier of the application program and the identifier of the target instance. The routing entry includes the identifier of the application program and an egress port of the first network device, the egress port of the first network device is a port determined based on the identifier of the target instance, and the egress port of the first network device is capable of communicating with a next-hop device on a path to the target apparatus. The identifier of the target instance may be an Internet Protocol (IP) address of the target instance. The IP address of the target instance may be, for example, an IP address of a virtual machine or an IP address of a server, or an IP address of a server and a port number of the server.

After receiving a packet from a terminal device, the first network device can forward the packet to the target apparatus based on the routing entry, and the target apparatus processes the packet. Because the target apparatus is the apparatus that satisfies the preset condition, that is, an apparatus with a relatively high computing capability, the target apparatus can process the packet relatively quickly. This achieves relatively high packet processing efficiency and better user experience. In addition, when each of a plurality of network devices in a network topology can be used as the first network device to perform the routing entry obtaining method, if some network devices are faulty, another network device may forward, to the target apparatus, the packet that is from the terminal device, to ensure packet processing and achieve relatively high reliability.

In this embodiment of this application, based on different objects connected to the first network device, that the first network device obtains an identifier of an application program, a computing capability of a first apparatus running the application program, and a computing capability of a second apparatus running the application program includes the following three possible implementations.

In a possible implementation, if the first network device is connected to the first apparatus and the second apparatus, that the first network device obtains an identifier of an application program, a computing capability of a first apparatus running the application program, and a computing capability of a second apparatus running the application program includes the following. The first network device receives a first packet from the first apparatus, where the first packet includes the computing capability of the first apparatus and the identifier of the application program. The first network device receives a second packet from the second apparatus, where the second packet includes the computing capability of the second apparatus and the identifier of the application program. In other words, when the first network device is connected to both the first apparatus and the second apparatus, a manner in which the first network device obtains the identifier of the application program, the computing capability of the first apparatus running the application program, and the computing capability of the second apparatus running the application program is receiving the first packet from the first apparatus and the second packet from the second apparatus.

In another possible implementation, if the first network device is connected to the first apparatus, that the first network device obtains an identifier of an application program, a computing capability of a first apparatus running the application program, and a computing capability of a second apparatus running the application program includes the following. The first network device receives a third packet from the first apparatus, where the third packet includes the computing capability of the first apparatus and the identifier of the application program. The first network device receives a fourth packet from a second network device in a same network topology, where the fourth packet includes the computing capability of the second apparatus and the identifier of the application program. In other words, when the first network device is connected to only the first apparatus, a manner in which the first network device obtains the identifier of the application program, the computing capability of the first apparatus running the application program, and the computing capability of the second apparatus running the application program is receiving the third packet from the first apparatus and the fourth packet from another network device such as the second network device in the network topology.

Certainly, it can be understood that if the first network device is connected to the second apparatus, an obtaining method is similar to the obtaining manner used if the first network device is connected to the first apparatus. To be specific, if the first network device is connected to the second apparatus, that the first network device obtains an identifier of an application program, a computing capability of a first apparatus, and a computing capability of a second apparatus includes the following. The first network device receives a tenth packet from the second apparatus, where the tenth packet includes the computing capability of the first apparatus and the identifier of the application program. The first network device receives an eleventh packet from a fifth network device in a same network topology, where the eleventh packet includes the computing capability of the second apparatus and the identifier of the application program.

In still another possible implementation, if the first network device is connected to a virtual router (VRouter), that the first network device obtains an identifier of an application program, a computing capability of a first apparatus running the application program, and a computing capability of a second apparatus running the application program includes the following. The first network device receives a fifth packet sent by the virtual router, where the fifth packet includes the identifier of the application program, the computing capability of the first apparatus, and the computing capability of the second apparatus. In other words, in this implementation, the first network device is not directly connected to the first apparatus and the second apparatus, but is connected to the first apparatus and the second apparatus through the virtual router. In this case, the virtual router collects the identifier of the application program, the computing capability of the first apparatus running the application program, and the computing capability of the second apparatus running the application program, and sends the identifier of the application program, the computing capability of the first apparatus, and the computing capability of the second apparatus to the first network device.

In this embodiment of this application, all of the computing capability of the first apparatus, the computing capability of the second apparatus, and the identifier of the application program may be added to a type-length-value (TLV) field of the corresponding packet, for sending. The first packet to a seventh packet may be Interior Gateway Protocol (IGP) packets, or may be Border Gateway Protocol (BGP) packets.

In this embodiment of this application, in the first possible implementation and the third possible implementation, after receiving the computing capability of the first apparatus, the computing capability of the second apparatus, and the identifier of the application program, the first network device may send, to another network device in a same network topology, the parameters or a packet carrying the parameters. For example, the method further includes the following. The first network device sends a sixth packet to a third network device in the same network topology, where the sixth packet includes the identifier of the application program, the computing capability of the first apparatus, and the computing capability of the second apparatus. The computing capability of the first apparatus, the computing capability of the second apparatus, and the identifier of the application program may be carried in a TLV field of the sixth packet. The sixth packet may be an IGP packet, or may be a BGP packet.

If the sixth packet is an IGP packet, after receiving the sixth packet, the third network device sends the identifier of the application program, the computing capability of the first apparatus, and the computing capability of the second apparatus to another network device in the same network topology. Therefore, each network device in the network topology can obtain the identifier of the application program, the computing capability of the first apparatus, and the computing capability of the second apparatus in such a flooding manner. If the sixth packet is a BGP packet, the third network device may be a network device, that is, a headend, connected to the terminal device.

In the second possible implementation, after receiving the identifier of the application program, and either the computing capability of the first apparatus or the computing capability of the second apparatus, the first network device may send the received parameters to another network device in the same network topology. For example, if the first network device is connected to the first apparatus, the first network device sends the seventh packet to a fourth network device in the same network topology, where the seventh packet includes the identifier of the application program and the computing capability of the first apparatus. If the first network device is connected to the second apparatus, the first network device sends a twelfth packet to a sixth network device in the same network topology, where the twelfth packet includes the identifier of the application program and the computing capability of the second apparatus. The computing capability of the first apparatus and the identifier of the application program may be carried in a TLV field of the seventh packet. The identifier of the application program and the computing capability of the second apparatus may be carried in a TLV field of the twelfth packet. The seventh packet and the twelfth packet may be IGP packets, or may be BGP packets.

If the seventh packet is an IGP packet, after receiving the seventh packet, the fourth network device sends the identifier of the application program and the computing capability of the first apparatus to another network device in the same network topology. Therefore, each network device in the network topology can obtain the computing capability of the first apparatus and the identifier of the application program in such a flooding manner. If the seventh packet is a BGP packet, the fourth network device may be a network device, that is, a headend, connected to the terminal device. Likewise, if the twelfth packet is an IGP packet, after receiving the twelfth packet, the sixth network device sends the identifier of the application program and the computing capability of the second apparatus to another network device in the same network topology. Therefore, each network device in the network topology can obtain the identifier of the application program and the computing capability of the second apparatus in such a flooding manner. If the twelfth packet is a BGP packet, the sixth network device may be a network device, that is, a headend, connected to the terminal device.

The foregoing describes specific details of obtaining, by an edge network device connected to an apparatus, the identifier of the application program, the computing capability of the first apparatus running the application program, and the computing capability of the second apparatus running the application program. When another network device that is in the network topology and that is not connected to the apparatus serves as the first network device to perform the step, the other network device receives the computing capability of the first apparatus, the computing capability of the second apparatus, and the identifier of the application program from the edge network device connected to the apparatus.

Optionally, that the first network device generates a routing entry based on the identifier of the application program and the identifier of the target instance includes the following. The first network device determines, based on the identifier of the target instance, the next-hop device on the path to the target apparatus. The first network device obtains, based on the next-hop device on the path to the target apparatus, the egress port that is of the first network device and that is capable of communicating with the next-hop device. In this embodiment of this application, the egress port in the routing entry is determined based on the identifier of the target instance, so as to generate the routing entry.

Correspondingly, the method further includes the following. The first network device receives an eighth packet from a terminal device, where the eighth packet includes the identifier of the application program. The first network device obtains the egress port of the first network device based on the identifier of the application program and the routing entry. The first network device sends the eighth packet through the egress port of the first network device. Because the egress port in the routing entry leads to the target apparatus, the packet that is from the terminal device can be sent to the target apparatus.

Optionally, the routing entry further includes network performance of the path, and that the first network device determines, based on the identifier of the target instance, the next-hop device on the path to the target apparatus includes the following. The first network device obtains the network performance of the path. The first network device determines, based on the network performance of the path and the identifier of the target instance, the next-hop device on the path to the target apparatus. Because the routing entry includes the network performance corresponding to the egress port, the path that reaches the target apparatus and that satisfies the specific network performance can be provided for the terminal device, so as to forward the packet that is from the terminal device, thereby improving user experience.

Optionally, the method further includes the following. The first network device receives a ninth packet from a terminal device, where the ninth packet includes the identifier of the application program and a network performance requirement of the application program. The first network device obtains the egress port of the first network device based on the identifier of the application program, the network performance requirement of the application program, and the routing entry, where the network performance of the path corresponding to the egress port matches the network performance requirement of the application program. The first network device sends the ninth packet through the egress port of the first network device.

Optionally, the routing entry further includes a weight value determined based on a computing capability of the target apparatus, and the weight value is used to identify a probability of sending a packet to the target apparatus through the egress port. When there is a plurality of target apparatuses, load balancing can be implemented while computing capabilities of the apparatuses are ensured.

According to a second aspect, an embodiment of this application further provides a packet sending method. The method may be applied to a terminal device, and includes the following steps. First, the terminal device sends an application processing request to a first device, where the application processing request includes a uniform resource locator (URL) of an application program. The first device may be a domain name system (DNS), a load balancer (LB), or a first network device, and the first network device may be a headend in a network topology. Next, the terminal device receives, from the first device, an identifier of the application program corresponding to the URL of the application program. The identifier of the application program is carried in a destination address field of a packet. Then, the terminal device sends the packet to the first network device, where the packet includes the identifier of the application program. The first network device stores a routing entry, where the routing entry includes the identifier of the application program and an egress port, and the egress port leads to a target apparatus. Because the target apparatus is an apparatus that satisfies a preset condition, that is, an apparatus with a relatively high computing capability, the target apparatus can process the packet relatively quickly. This achieves relatively high packet processing efficiency and better user experience.

According to a third aspect, an embodiment of this application further provides a sending method. The method may be applied to a first device, and the first device may be a DNS, an LB, or an edge network device connected to a terminal device. The method includes the following steps. First, the first device receives an application processing request from the terminal device, where the application processing request carries a URL of an application program. Next, the first device obtains an identifier of the application program based on the URL of the application program and a mapping relationship, where the mapping relationship includes the URL of the application program and the identifier of the application program. Finally, the first device sends the identifier of the application program to the terminal device. The first device sends the identifier of the application program to the terminal device, so that the terminal device can send a packet carrying the identifier of the application program, and forward the packet to a target apparatus with a relatively high computing capability by using a network topology, thereby improving user experience.

According to a fourth aspect, an embodiment of this application further provides a routing entry obtaining apparatus. The routing entry obtaining apparatus is applied to a first network device. The routing entry obtaining apparatus includes a first obtaining unit configured to obtain an identifier of an application program, a computing capability of a first apparatus running the application program, and a computing capability of a second apparatus running the application program, a determining unit configured to determine, based on the computing capability of the first apparatus and the computing capability of the second apparatus, an apparatus whose computing capability satisfies a preset condition as a target apparatus, a second obtaining unit configured to obtain an identifier of a target instance, where the identifier of the target instance is used to identify an instance of the application program run by the target apparatus, and a generation unit configured to generate a routing entry based on the identifier of the application program and the identifier of the target instance, where the routing entry includes the identifier of the application program and an egress port of the routing entry obtaining apparatus, the egress port of the routing entry obtaining apparatus is a port determined based on the identifier of the target instance, and the egress port of the routing entry obtaining apparatus is capable of communicating with a next-hop device on a path to the target apparatus.

Optionally, the routing entry obtaining apparatus is connected to the first apparatus and the second apparatus, and the first obtaining unit is configured to receive a first packet from the first apparatus, where the first packet includes the computing capability of the first apparatus and the identifier of the application program, and receive a second packet from the second apparatus, where the second packet includes the computing capability of the second apparatus and the identifier of the application program.

Optionally, the routing entry obtaining apparatus is connected to the first apparatus, and the first obtaining unit is configured to receive a third packet from the first apparatus, where the third packet includes the computing capability of the first apparatus and the identifier of the application program, and receive a fourth packet from a second network device in a same network topology, where the fourth packet includes the computing capability of the second apparatus and the identifier of the application program.

Optionally, the routing entry obtaining apparatus is connected to a virtual router, and the first obtaining unit is configured to receive a fifth packet sent by the virtual router, where the fifth packet includes the identifier of the application program, the computing capability of the first apparatus, and the computing capability of the second apparatus.

Optionally, the routing entry obtaining apparatus further includes a first sending unit configured to send a sixth packet to a third network device in a same network topology, where the sixth packet includes the identifier of the application program, the computing capability of the first apparatus, and the computing capability of the second apparatus.

Optionally, the routing entry obtaining apparatus further includes a second sending unit configured to send a seventh packet to a fourth network device in the same network topology, where the seventh packet includes the identifier of the application program and the computing capability of the first apparatus.

Optionally, the generation unit is configured to determine, based on the identifier of the target instance, the next-hop device on the path to the target apparatus, and obtain, based on the next-hop device on the path to the target apparatus, the egress port that is of the routing entry obtaining apparatus and that is capable of communicating with the next-hop device.

Optionally, the routing entry obtaining apparatus further includes a first receiving unit configured to receive an eighth packet from a terminal device, where the eighth packet includes the identifier of the application program, a third obtaining unit configured to obtain the egress port of the first network device based on the identifier of the application program and the routing entry, and a third sending unit configured to send the eighth packet through the egress port of the first network device.

Optionally, the routing entry further includes network performance of the path, and the generation unit is further configured to obtain the network performance of the path, and determine, based on the network performance of the path and the identifier of the target instance, the next-hop device on the path to the target apparatus.

Optionally, the routing entry obtaining apparatus further includes a second receiving unit configured to receive a ninth packet from a terminal device, where the ninth packet includes the identifier of the application program and a network performance requirement of the application program, a fourth obtaining unit configured to obtain the egress port of the routing entry obtaining apparatus based on the identifier of the application program, the network performance requirement of the application program, and the routing entry, where the network performance of the path corresponding to the egress port matches the network performance requirement of the application program, and a fourth sending unit configured to send the ninth packet through the egress port of the routing entry obtaining apparatus.

Optionally, the routing entry further includes a weight value determined based on a computing capability of the target apparatus, and the weight value is used to identify a probability of sending a packet to the target apparatus through the egress port.

According to a fifth aspect, an embodiment of this application further provides a packet sending apparatus. The apparatus may be applied to a terminal device, and includes a first sending unit configured to send an application processing request to a first device, where the application processing request includes a URL of an application program, a receiving unit configured to receive, from the first device, an identifier of the application program corresponding to the URL of the application program, and a second sending unit configured to send a packet to a first network device, where the packet includes the identifier of the application program.

Optionally, the first device is a DNS, an LB, or the first network device.

According to a sixth aspect, an embodiment of this application further provides a sending apparatus. The apparatus may be applied to a first device. The sending apparatus further includes a receiving unit configured to receive an application processing request from a terminal device, where the application processing request carries a URL of an application program, an obtaining unit configured to obtain an identifier of the application program based on the URL of the application program and a mapping relationship, where the mapping relationship includes the URL of the application program and the identifier of the application program, and a sending unit configured to send the identifier of the application program to the terminal device.

Optionally, the first device may be a DNS, an LB, or an edge network device connected to the terminal device.

DESCRIPTION OF EMBODIMENTS

To provide a user with an apparatus with an appropriate computing capability to perform communication, embodiments of this application provide a network system, a routing entry obtaining method and apparatus, and a device. In the embodiments of this application, an apparatus running an application program may be an apparatus such as a virtual machine, a server, or a container. For ease of description, in method embodiments and examples provided in this application, that the apparatus running the application program is a virtual machine is used as an example for description.

Figure 1:
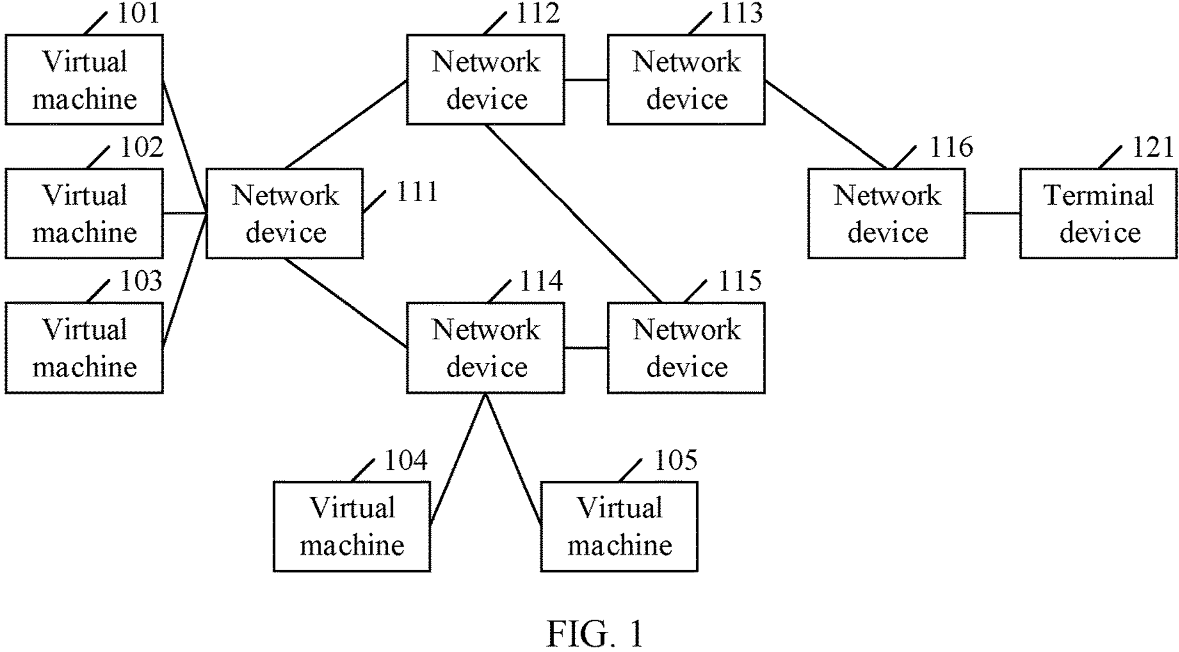
FIG. 1 is a schematic structural diagram of a network system according to an embodiment of this application.

FIG. 1 is a schematic structural diagram of a network system 100 according to an embodiment of this application. In FIG. 1, the network system includes a virtual machine 101, a virtual machine 102, a virtual machine 103, a virtual machine 104, a virtual machine 105, a network device 111, a network device 112, a network device 113, a network device 114, a network device 115, a network device 116, and a terminal device 121. The virtual machine 101, the virtual machine 102, and the virtual machine 103 are all connected to the network device 111. Both the virtual machine 104 and the virtual machine 105 are connected to the network device 114. The network device 111 is connected to both the network device 112 and the network device 114. The network device 112 is connected to both the network device 113 and the network device 115. The network device 114 is connected to the network device 115. The network device 113 is connected to the network device 116. The network device 116 is connected to the terminal device 121.

It should be noted that in this embodiment of this application, a connection between a virtual machine and a network device may be a direct connection, or may be an indirect connection. The indirect connection between the virtual machine and the network device may mean that the virtual machine is connected to the network device through a device such as a gateway. A connection between a network device and a terminal device may be a direct connection, or may be an indirect connection. The indirect connection between the network device and the terminal device may mean that the network device is connected to the terminal device through a customer edge (CE) device.

In this embodiment of this application, any network device in FIG. 1 may be a device such as a router or a layer 3 switch. The network device 111 and the network device 114 are edge network devices connected to virtual machines. For example, the network device 111 and the network device 114 are provider edge (PE) devices. The network device 112, the network device 113, the network device 115, and the network device 116 are non-edge network devices. For example, the network device 112, the network device 113, the network device 115, and the network device 116 are provider (P) devices. The network device 116 may be connected to the terminal device 121 through a customer edge device.

The terminal device 121 may be a mobile phone or a personal computer (PC). The personal computer may be a tablet PC, a notebook computer, an ultra-mobile personal computer, a personal digital assistant, or the like. An application program is installed in the terminal device 121. In this embodiment of this application, the application program may be, for example, a game-related APP, a video-related APP, an email-related APP, an instant messaging-related APP, a traffic information-related APP, or a weather forecast-related APP.

One or more application program instances of a same application program are deployed on the virtual machine 101, the virtual machine 102, the virtual machine 103, the virtual machine 104, and the virtual machine 105. Different application program instances are deployed on different virtual machines. A plurality of virtual machines connected to a same network device can be deployed on one or more servers. For example, the virtual machine 101, the virtual machine 102, and the virtual machine 103 may be deployed on a same server, or may be deployed on different servers. For example, the virtual machine 104 and the virtual machine 105 may be deployed on a same server, or may be deployed on different servers.

Figure 2:
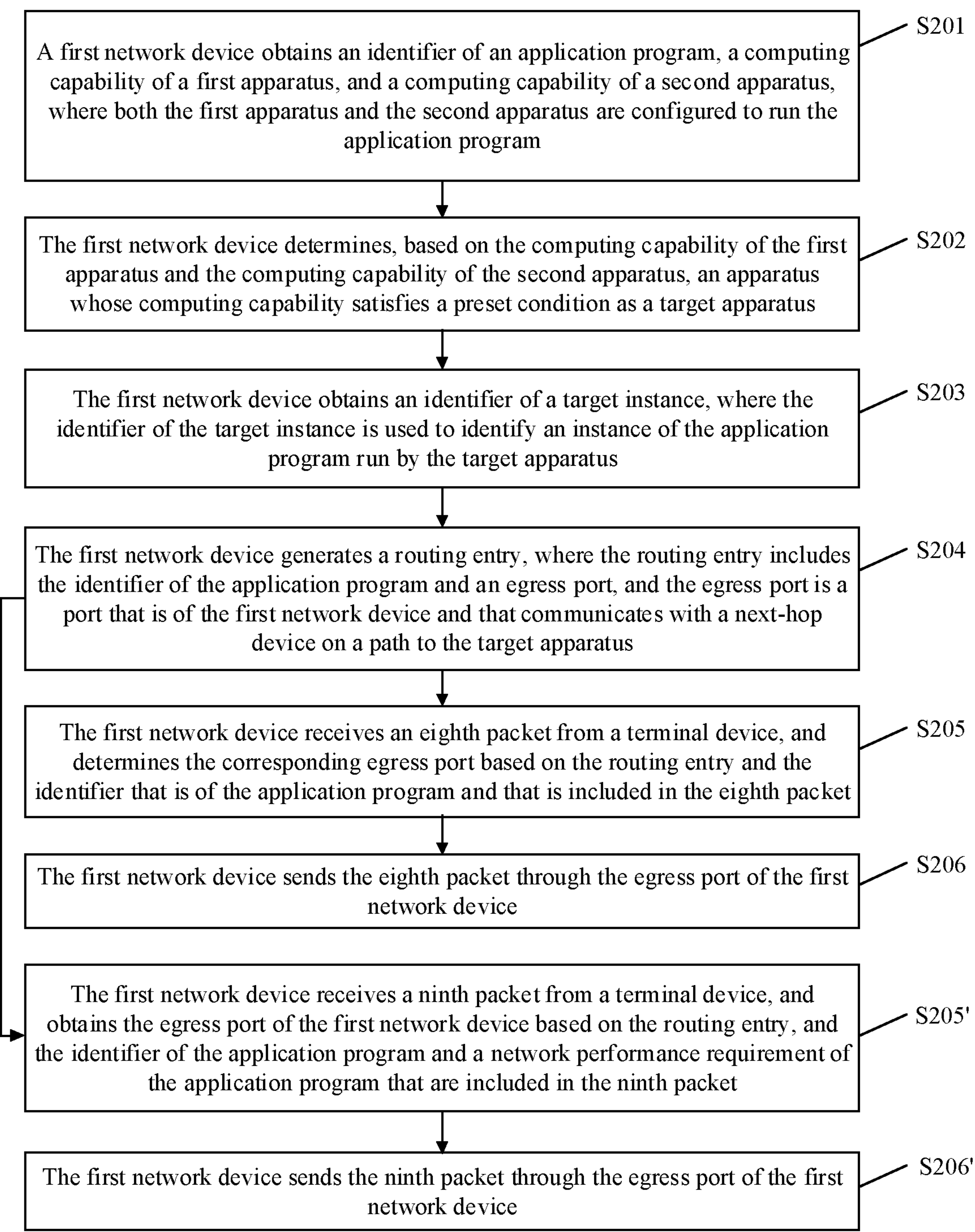
FIG. 2 is a flowchart of a routing entry obtaining method according to an embodiment of this application.

FIG. 2 is a flowchart of a routing entry obtaining method according to an embodiment of this application.

The routing entry obtaining method provided in this embodiment of this application may be performed by a first network device. The first network device may be any network device in FIG. 1. The first network device may be an edge network device connected to a virtual machine, for example, the network device 111 or the network device 114. The first network device may alternatively be a network device in a network topology other than the edge network device connected to the virtual machine, for example, may be the network device 112, the network device 113, the network device 115, or the network device 116. Specific details of performing the method by the edge network device connected to the virtual machine are different from specific details of performing the method by the network device other than the edge network device. The following provides detailed descriptions.

S201. The first network device obtains an identifier of an application program, a computing capability of a first apparatus, and a computing capability of a second apparatus, where both the first apparatus and the second apparatus are configured to run the application program.

In this embodiment of this application, the computing capability of the first apparatus and the computing capability of the second apparatus include, for example, one or more of load, a quantity of CPU cores, and a size of a RAM. This is not limited in this embodiment of this application. The first apparatus may be a virtual machine, a server, or a container. The second apparatus may be a virtual machine, a server, or a container.

The identifier of the application program is used to identify the application program. For example, the identifier of the application program is a protocol characteristic string or an application attribute code of the application program. This is not limited in this embodiment of this application. The identifier of the application program may be a segment identifier (SID).

In this embodiment of this application, if the first network device is an edge network device connected to a virtual machine in FIG. 1, for example, the network device 111 or the network device 114, the first network device may obtain the computing capability of the first apparatus, the computing capability of the second apparatus, and the identifier of the application program in three implementations.

In a first possible implementation, the first network device is connected to both the first apparatus and the second apparatus. If the first network device is the network device 111, the first apparatus is the virtual machine 101 in FIG. 1, and the second apparatus is the virtual machine 102 in FIG. 1. That the first network device obtains an identifier of an application program, a computing capability of a first apparatus, and a computing capability of a second apparatus includes the following. The first network device receives a first packet from the first apparatus, where the first packet includes the computing capability of the first apparatus and the identifier of the application program. The first network device receives a second packet from the second apparatus, where the second packet includes the computing capability of the second apparatus and the identifier of the application program.

In a second possible implementation, the first network device is connected to either the first apparatus or the second apparatus. If the first network device is the network device 111 in FIG. 1, the first apparatus is the virtual machine 101 in FIG. 1, and the second apparatus is the virtual machine 104 in FIG. 1. If the first network device is the network device 114 in FIG. 1, the first apparatus is the virtual machine 102 in FIG. 1, and the second apparatus is the virtual machine 104 in FIG. 1. If the first network device is connected to the first apparatus, that the first network device obtains an identifier of an application program, a computing capability of a first apparatus, and a computing capability of a second apparatus includes the following. The first network device receives a third packet from the first apparatus, where a third packet includes the computing capability of the first apparatus and the identifier of the application program. The first network device receives a fourth packet from a second network device in a same network topology, where a fourth packet includes the computing capability of the second apparatus and the identifier of the application program. If the first network device is connected to the second apparatus, that the first network device obtains an identifier of an application program, a computing capability of a first apparatus, and a computing capability of a second apparatus includes the following. The first network device receives a tenth packet from the second apparatus, where the tenth packet includes the computing capability of the first apparatus and the identifier of the application program. The first network device receives an eleventh packet from a fifth network device in a same network topology, where the eleventh packet includes the computing capability of the second apparatus and the identifier of the application program.

Using FIG. 1 as an example, if the first network device is the network device 111, the second network device may be the network device 114.

In a third possible implementation, the first network device is connected to a VRouter. In this embodiment of this application, the virtual router may be connected to the first apparatus and the second apparatus through a hypervisor. The hypervisor obtains the computing capability of the first apparatus, the computing capability of the second apparatus, and the identifier of the application program. The hypervisor sends the computing capability of the first apparatus, the computing capability of the second apparatus, and the identifier of the application program to the virtual router, and the virtual router sends the computing capability of the first apparatus, the computing capability of the second apparatus, and the identifier of the application program to the first network device. That the first network device obtains an identifier of an application program, a computing capability of a first apparatus, and a computing capability of a second apparatus includes the following. The first network device receives a fifth packet sent by the virtual router, where the fifth packet includes the identifier of the application program, the computing capability of the first apparatus, and the computing capability of the second apparatus. In this implementation, the first apparatus may be a first virtual machine, and the second apparatus may be a second virtual machine.

In this embodiment of this application, all of the computing capability of the first apparatus, the computing capability of the second apparatus, and the identifier of the application program may be added to a TLV field of the corresponding packet, for sending. The first packet to a seventh packet may be IGP packets, or may be BGP packets.

In the first possible implementation and the third possible implementation, after receiving the computing capability of the first apparatus, the computing capability of the second apparatus, and the identifier of the application program, the first network device may send, to another network device in a same network topology, the parameters or a packet carrying the parameters. For example, the first network device sends a sixth packet to a third network device in the same network topology, where the sixth packet includes the identifier of the application program, the computing capability of the first apparatus, and the computing capability of the second apparatus. The computing capability of the first apparatus, the computing capability of the second apparatus, and the identifier of the application program may be carried in a TLV field of the sixth packet. The sixth packet may be an IGP packet, or may be a BGP packet.

If the sixth packet is an IGP packet, after receiving the sixth packet, the third network device sends the identifier of the application program, the computing capability of the first apparatus, and the computing capability of the second apparatus to another network device in the same network topology. Therefore, each network device in the network topology can obtain the identifier of the application program, the computing capability of the first apparatus, and the computing capability of the second apparatus in such a flooding manner. If the sixth packet is a BGP packet, the third network device may be a network device, that is, a headend, connected to the terminal device.

In the second possible implementation, after receiving the identifier of the application program, and either the computing capability of the first apparatus or the computing capability of the second apparatus, the first network device may send the received parameters to another network device in the same network topology. For example, if the first network device is connected to the first apparatus, the first network device sends the seventh packet to a fourth network device in the same network topology, where the seventh packet includes the identifier of the application program and the computing capability of the first apparatus. If the first network device is connected to the second apparatus, the first network device sends a twelfth packet to a sixth network device in the same network topology, where the twelfth packet includes the identifier of the application program and the computing capability of the second apparatus. The computing capability of the first apparatus and the identifier of the application program may be carried in a TLV field of the seventh packet. The identifier of the application program and the computing capability of the second apparatus may be carried in a TLV field of the twelfth packet. The seventh packet and the twelfth packet may be IGP packets, or may be BGP packets.

If the seventh packet is an IGP packet, after receiving the seventh packet, the fourth network device sends the identifier of the application program and the computing capability of the first apparatus to another network device in the same network topology. Therefore, each network device in the network topology can obtain the computing capability of the first apparatus and the identifier of the application program in such a flooding manner. If the seventh packet is a BGP packet, the fourth network device may be a network device, that is, a headend, connected to the terminal device. Likewise, if the twelfth packet is an IGP packet, after receiving the twelfth packet, the sixth network device sends the identifier of the application program and the computing capability of the second apparatus to another network device in the same network topology. Therefore, each network device in the network topology can obtain the identifier of the application program and the computing capability of the second apparatus in such a flooding manner. If the twelfth packet is a BGP packet, the sixth network device may be a network device, that is, a headend, connected to the terminal device.

The foregoing describes specific details of performing S201 by an edge network device connected to an apparatus. When another network device that is in the network topology and that is not connected to the apparatus performs S201, the other network device receives the computing capability of the first apparatus, the computing capability of the second apparatus, and the identifier of the application program from the edge network device connected to the apparatus.

S202. The first network device determines, based on the computing capability of the first apparatus and the computing capability of the second apparatus, an apparatus whose computing capability satisfies a preset condition as a target apparatus.

In this embodiment of this application, after obtaining the computing capability of the first apparatus connected to the network topology and the computing capability of the second apparatus connected to the first network device, the first network device in the network topology may determine, based on the computing capability of the first apparatus and the computing capability of the second apparatus, the target apparatus whose computing capability satisfies the preset condition. The first network device herein may be an edge network device connected to the first apparatus and/or the second apparatus, or may be a network device connected to the edge network device.

In a possible implementation, the preset condition may be determined based on a threshold of the computing capability. If the computing capability includes load, the preset condition may be, for example, that the load is less than or equal to 50%. If the computing capability includes a quantity of CPU cores, the preset condition may be, for example, that the quantity of CPU cores is greater than or equal to four. If the computing capability includes a size of a RAM, the preset condition may be, for example, that the size of the RAM is greater than or equal to 100 megabytes.

In another possible implementation, the preset condition may alternatively be determined based on the computing capability of the first apparatus and the computing capability of the second apparatus. To be specific, the first network device may sort apparatuses based on computing capabilities of the apparatuses, and then select, from the apparatuses, apparatuses that rank in the top 1-N as target apparatuses. During specific implementation, a corresponding score may be calculated for each apparatus based on the computing capability of the apparatus. A higher score indicates a higher computing capability of the apparatus, and a lower score indicates a lower computing capability of the apparatus. Afterwards, the computing capabilities of the apparatuses are sorted based on the corresponding scores of the apparatuses, and then the apparatuses that rank in the top 1-N are selected as target apparatuses, or an apparatus whose score is greater than or equal to a preset score is selected as the target apparatus. N is an integer greater than or equal to 1. In this embodiment of this application, the first apparatus and/or the second apparatus may satisfy the preset condition. If the two apparatuses satisfy the preset condition, one apparatus may be selected from the two apparatuses as the target apparatus, or both of the two apparatuses are used as target apparatuses, to communicate with the terminal device to implement load balancing. If one apparatus is selected from the two apparatuses that satisfy the preset condition, an apparatus may be randomly selected as the target apparatus, or an apparatus with a higher computing capability may be selected from the first apparatus and the second apparatus, as the target apparatus.

S203. The first network device obtains an identifier of a target instance, where the identifier of the target instance is used to identify an instance of the application program run by the target apparatus.

For example, the identifier of the target instance may be an IP address of the target instance. When one target apparatus runs only one target instance of a same application program, an IP address of the target instance may be an IP address of the target apparatus. The identifier of the target instance may be a SID.

For example, if target apparatuses include a target apparatus 1 and a target apparatus 2, the target apparatus 1 runs a target instance 1 of an application program A, and the target apparatus 2 runs a target instance 2 of the application program A, an identifier of the target instance 1 may be an IP address of the target apparatus 1, and an identifier of the target instance 2 may be an IP address of the target apparatus 2.

Certainly, the identifier of the target instance may be the IP address of the target instance, or may be another type of identifier. Persons skilled in the art may determine the identifier of the target instance depending on an actual situation.

In this embodiment of this application, the first network device may obtain the identifier of the target instance after determining the target apparatus, or may obtain the identifier of the target instance before determining the target apparatus.

If the identifier of the target instance is obtained after the target apparatus is determined, the first network device may send an identifier obtaining request to the target apparatus or the virtual router connected to the target apparatus, and receive the identifier of the target instance that is sent, to the first network device according to the identifier obtaining request, by the target apparatus or the virtual router connected to the target apparatus. When preset conditions for selecting target apparatuses by all first network devices in the network topology are the same, identifiers of target instances that need to be obtained by all the first network devices are also the same. Therefore, after obtaining the identifier of the target instance, the edge network device connected to the target apparatus may send the identifier of the target instance to another network device in the network topology in a flooding manner, so that each network device obtains the identifier of the target instance.

Using FIG. 1 as an example, if the network device 114 determines that the target apparatus is the virtual machine 104, the network device 114 may send an identifier obtaining request to the virtual machine 104, and receive an identifier that is of a target instance run by the virtual machine 104 and that is sent by the virtual machine 104 according to the identifier obtaining request. After obtaining the identifier of the target instance, the network device 114 may send the identifier of the target instance to other network devices in the network topology in a flooding manner, so that the network device 111 to the network device 116 all obtain the identifier of the target instance.

If the identifier of the target instance is obtained before the target apparatus is determined, the identifier of the target instance may be carried in a packet that carries the identifier of the application program and a computing capability of the target apparatus and that is sent by the target apparatus or the virtual router connected to the target apparatus. In other words, when sending, to the first network device, the packet carrying the identifier of the application program and the computing capability of the target apparatus, the target apparatus or the virtual router connected to the target apparatus further adds the identifier of the target instance to a TLV field of the packet and sends the identifier of the target instance together with the identifier of the application program and the computing capability of the target apparatus. Further, the packet carrying the computing capability of the first apparatus further carries an identifier of an instance of the application program run by the first apparatus, and the packet carrying the computing capability of the second apparatus further carries an identifier of an instance of the application program run by the second apparatus. In this way, after the target apparatus is determined, the identifier of the target instance can be determined from the identifier of the instance of the application program run by the first apparatus and the identifier of the instance of the application program run by the second apparatus. After receiving the identifier of the instance of the application program run by the first apparatus and the identifier of the instance of the application program run by the second apparatus, the first network device may send the two identifiers to another network device in the network topology in a flooding manner. A specific process is similar to the process of sending the computing capability of the first apparatus, the computing capability of the second apparatus, and the identifier of the application program in a flooding manner. Details are not described herein again.

S204. The first network device generates a routing entry, where the routing entry includes the identifier of the application program and an egress port, and the egress port is capable of communicating with a next-hop device on a path to the target apparatus.

In this embodiment of this application, if the first network device is an edge network device connected to the first apparatus and/or the second apparatus, the first network device generates the routing entry based on the identifier of the target instance and the identifier of the application program. Further, the first network device may obtain the path from the edge network device to the target apparatus based on the identifier of the target instance, determine the egress port of the first network device based on the path, where the egress port is a port used by the first network device to communicate with the next-hop device on the path to the target apparatus, and obtain the routing entry based on the egress port and the identifier of the application program.

Using FIG. 1 as an example, the target apparatus is the virtual machine 104, and the network device 114 is an edge network device connected to the virtual machine 104. The network device 114 obtains a path from the network device 114 to the virtual machine 104 based on the identifier of the target instance run by the virtual machine 104. The network device 114 determines an egress port of the network device 114 based on the obtained path. The egress port is a port used by the network device 114 to communicate with a next-hop device on the path. Finally, the network device 114 obtains a routing entry of the network device 114 based on the egress port and the identifier of the application program.

The network device 112 in FIG. 1 is used as an example. The target apparatus is the virtual machine 104, and the network device 112 obtains a path from the network device 112 to the virtual machine 104 based on the identifier of the target instance run by the virtual machine 104. The path is: the network device 112→the network device 111→the network device 114. The network device 112 determines, based on the path, a port that is of the network device 112 and that communicates with a next-hop device on the path, that is, the network device 111. The network device 112 uses the obtained port as an egress port. The network device 112 obtains a routing entry of the network device 112 based on the egress port and the identifier of the application program. Methods for obtaining routing entries of the network device 111, the network device 113, the network device 115, and the network device 116 are basically the same as the method for obtaining the routing entry of the network device 112. Details are not described herein again.

An entry included in Table 1 is an example of a routing entry including an egress port reaching the first apparatus. In Table 1, an APP ID corresponds to an egress port 1, and the egress port 1 can reach the first apparatus.

TABLE 1

| Identifier of an application program | Egress port |
|---|---|
| APP ID | Egress port 1 |

There may be one or more paths from the first network device to a target apparatus. If there are a plurality of paths from the first network device to the target apparatus, a shortest path may be selected from the paths, or a path that satisfies a network performance requirement of the application program may be determined based on network performance of the paths, so as to obtain a corresponding egress port based on the selected or determined path. The network performance requirement of the application program may be represented as one or more of information such as a bandwidth, a latency, a latency jitter, a packet loss, reliability, and security.

The network performance requirement of the application program may be represented as a specific value of information such as a bandwidth and a latency (for example, a value of a minimum bandwidth and a value of an upper latency limit), or may be represented as a service level agreement (SLA) indicative of information such as a bandwidth and a latency, or may be represented as a path attribute in a path computation algorithm. The SLA specifies multi-dimensional network performance requirements, for example, a bandwidth of 150 megabits per second (Mbit/s), an upper latency limit of 5 milliseconds (ms), and a latency jitter of +/−2 ms. The path attribute may be indicated by using a color. For example, red indicates that information about the network performance requirement of the application program is a high bandwidth, or blue indicates that information about the network performance requirement of the application program is a low latency. The SLA may also be indicated by using a color. For example, an SLA indicated by red indicates a high bandwidth and a low latency, or an SLA indicated by blue indicates a low bandwidth. It should be noted that "high" and "low" are relative to each other in this embodiment of this application. Specific degrees of "high" and "low" are determined by persons skilled in the art.

During generation of the routing entry, the routing entry may include the network performance of the path in addition to the identifier of the application program and the egress port.

Entries included in Table 2 are examples of routing entries including egress ports reaching the second apparatus. In Table 2, an APP ID corresponds to three egress ports: an egress port 2, an egress port 3, and an egress port 4. Different egress ports correspond to paths with different network performance. All the three egress ports can reach the second apparatus.

TABLE 2

| Identifier of an application program | Egress port | Network performance requirement |
|---|---|---|
| APP ID | Egress port 2 | Bandwidth >20 Mbit/s |
| | Egress port 3 | Latency <1 ms |
| | Egress port 4 | Latency jitter of +/−2 ms |

It should be noted that in this embodiment of this application, the egress port may be a physical port, or may be a logical port. If the egress port is a logical port, a tunnel identifier may be used to identify the egress port. The tunnel identifier is used to identify a tunnel. In Table 2, the egress port 2 may be indicated by using a tunnel identifier 1, the egress port 3 may be indicated by using a tunnel identifier 2, and the egress port 4 may be indicated by using a tunnel identifier 3.

In this embodiment of this application, the routing entry may further include a weight value determined based on the computing capability of the target apparatus, and the weight value is used to identify a probability of sending a packet to the target apparatus through the egress port. When there is a plurality of target apparatuses, weight values are used to indicate load balancing capabilities of the plurality of target apparatuses. In actual application, the weight value may be determined based on the computing capability of the target apparatus.

Entries included in Table 3 are examples of routing entries including egress ports respectively reaching the first apparatus and the second apparatus. In Table 3, an APP ID corresponds to two egress ports: an egress port 5 and an egress port 6. The egress port 5 can reach the first apparatus and the egress port 6 can reach the second apparatus. Assuming that a ratio of the computing capability of the first apparatus to the computing capability of the second apparatus is 3:2, a weight value corresponding to the egress port 5 is 60%, and a weight value corresponding to the egress port 6 is 40%. In other words, in packets (for example, the following eighth packet) that include the APP ID in Table 3 and that are received by the first network device from the terminal device, 60% of the packets reach the first apparatus, and 40% of the packets reach the second apparatus, so as to implement load balancing.

TABLE 3

| Identifier of an application program | Egress port | Weight value |
|---|---|---|
| APP ID | Egress port 5 | 60% |
| | Egress port 6 | 40% |

In this embodiment of this application, if the routing entry includes the identifier of the application program and the egress port, for example, the routing entry described in Table 1, the first network device may correspondingly perform S204 and S205. If the routing entry includes the identifier of the application program, the egress port, and the network performance of the path, for example, the routing entry described in Table 2, the first network device may perform S205' and S206'.

S205. The first network device receives the eighth packet from the terminal device, and determines the corresponding egress port based on the routing entry and the identifier that is of the application program and that is included in the eighth packet.

In this embodiment of this application, the identifier of the application program may be carried in a destination address field of the eighth packet. The eighth packet may be, for example, an IP version 4 (IPv4) packet or an IP version 6 (IPv6) packet. If the eighth packet is an IPv6 packet, the eighth packet may be a segment routing version 6 (SRv6) packet in the IPv6 packet.

S206. The first network device sends the eighth packet through the egress port of the first network device.

S205'. The first network device receives a ninth packet from the terminal device, and obtains the egress port of the first network device based on the routing entry, and the identifier of the application program and the network performance requirement of the application program that are included in the ninth packet.

In this embodiment of this application, the identifier of the application program and the network performance requirement of the application program may be carried in a destination address field of the ninth packet. The ninth packet may be, for example, an IPv4 packet or an IPv6 packet. If the ninth packet is an IPv6 packet, the ninth packet may be an SRv6 packet.

The network performance of the path corresponding to the egress port determined by the first network device matches the network performance requirement of the application program. For example, the network performance requirement that is of the application program and that is carried in the ninth packet is that a bandwidth is higher than 20 Mbit/s. Assuming that all the three egress ports in Table 2 can reach the target apparatus, the first network device may select an egress port, that is, the egress port 2, corresponding to the path whose network performance matches the network performance requirement of the application program to send the ninth packet.

S206'. The first network device sends the ninth packet through the egress port of the first network device.

In this embodiment of this application, the terminal device may obtain identifier of the application program in a plurality of manners. In a first possible implementation, the identifier of the application program may be configured for the terminal device. In a second possible implementation, the terminal device may obtain the identifier of the application program from a DNS, an LB, or a headend (for example, the network device 116 in FIG. 1) in the network topology. Further, the terminal device may send a service processing request to the DNS, the LB, or the headend, where the service processing request carries a URL of the application program. A mapping relationship between the URL of the application program and the identifier of the application program is prestored in the DNS, the LB, or the headend. After receiving the service processing request, the DNS, the LB, or the headend may determine the corresponding identifier of the application program based on the URL in the service processing request and the mapping relationship, and send the identifier of the application program to the terminal device.

For a manner in which the terminal device obtains the network performance requirement of the application program, refer to the foregoing two possible implementations. Details are not described herein again.

Certainly, the foregoing two possible implementations do not constitute any limitation on the technical solutions of this application. Persons skilled in the art may design implementations depending on an actual situation.

In this embodiment of this application, the first network device obtains the identifier of the application program, the computing capability of the first apparatus running the application program, and the computing capability of the second apparatus running the application program, determines, based on the computing capability of the first apparatus and the computing capability of the second apparatus, the apparatus whose computing capability satisfies the preset condition as the target apparatus, and generates the routing entry based on the identifier of the application program and the identifier of the target instance of the application program run by the target apparatus. After receiving a packet from the terminal device, the first network device can forward the packet to the target apparatus based on the routing entry, and the target apparatus processes the packet. Because the target apparatus is the apparatus that satisfies the preset condition, that is, an apparatus with a relatively high computing capability, the target apparatus can process the packet relatively quickly. This achieves relatively high packet processing efficiency and better user experience.

In addition, when each of a plurality of network devices in the network topology can be used as the first network device to perform the routing entry obtaining method, if some network devices are faulty, another network device may forward, to the target apparatus, the packet that is from the terminal device, to ensure packet processing and achieve relatively high reliability.

The following describes, based on the network system in FIG. 1, the routing entry generation method by using an application scenario of running an IGP in the network topology as an example.

S301. The network device 111 separately receives packets from the virtual machine 101, the virtual machine 102, and the virtual machine 103, and the network device 114 separately receives packets from the virtual machine 104 and the virtual machine 105.

The packet from the virtual machine 101 includes an identifier of an application program A, a computing capability of the virtual machine 101, and an identifier of an instance 1 of the application program A run by the virtual machine 101. The packet from the virtual machine 102 includes the identifier of the application program A, a computing capability of the virtual machine 102, and an identifier of an instance 2 of the application program A run by the virtual machine 102. The packet from the virtual machine 103 includes the identifier of the application program A, a computing capability of the virtual machine 103, and an identifier of an instance 3 of the application program A run by the virtual machine 103. The packet from the virtual machine 104 includes the identifier of the application program A, a computing capability of the virtual machine 104, and an identifier of an instance 4 of the application program A run by the virtual machine 104. The packet from the virtual machine 105 includes the identifier of the application program A, a computing capability of the virtual machine 105, and an identifier of an instance 5 of the application program A run by the virtual machine 105.

S302. Based on the IGP, the network device 111 sends, in a flooding manner, the identifier of the application program A, the computing capability of the virtual machine 101, the computing capability of the virtual machine 102, the computing capability of the virtual machine 103, the identifier of the instance 1, the identifier of the instance 2, and the identifier of the instance 3 in the network topology, and the network device 114 sends, in a flooding manner, the identifier of the application program A, the computing capability of the virtual machine 104, the computing capability of the virtual machine 105, the identifier of the instance 4, and the identifier of the instance 5 in the network topology. In this way, each network device in the network topology can obtain the identifier of the application program A, the computing capability of the virtual machine 101, the computing capability of the virtual machine 102, the computing capability of the virtual machine 103, the computing capability of the virtual machine 104, the computing capability of the virtual machine 105, the identifier of the instance 1, the identifier of the instance 2, the identifier of the instance 3, the identifier of the instance 4, and the identifier of the instance 5.

Alternatively, S302' is performed.

S302'. Based on a BGP, the network device 111 sends the identifier of the application program A, the computing capability of the virtual machine 101, the computing capability of the virtual machine 102, the computing capability of the virtual machine 103, the identifier of the instance 1, the identifier of the instance 2, and the identifier of the instance 3 to a headend connected to the terminal device 121, that is, the network device 116, and the network device 114 sends the identifier of the application program A, the computing capability of the virtual machine 104, the computing capability of the virtual machine 105, the identifier of the instance 4, and the identifier of the instance 5 to the headend connected to the terminal device 121, that is, the network device 116. In this way, the network device 116 obtains the identifier of the application program A, the computing capability of the virtual machine 101, the computing capability of the virtual machine 102, the computing capability of the virtual machine 103, the computing capability of the virtual machine 104, the computing capability of the virtual machine 105, the identifier of the instance 1, the identifier of the instance 2, the identifier of the instance 3, the identifier of the instance 4, and the identifier of the instance 5.

Before sending the information to the headend connected to the terminal device 121, that is, the network device 116, the network device 111 and the network device 114 may first separately establish a BGP session with the network device 116.

S303: The network device, such as all network devices or the network device 116 in the network topology, that obtains the identifier of the application program A, the computing capability of the virtual machine 101, the computing capability of the virtual machine 102, the computing capability of the virtual machine 103, the computing capability of the virtual machine 104, the computing capability of the virtual machine 105, the identifier of the instance 1, the identifier of the instance 2, the identifier of the instance 3, the identifier of the instance 4, and the identifier of the instance 5 determines, from the five virtual machines, target virtual machines that satisfy a preset computing capability condition, for example, the virtual machine 101, the virtual machine 104, and the virtual machine 105, determines, based on the identifier of the instance 1, an egress port reaching the virtual machine 101, determines, based on the identifier of the instance 4, an egress port reaching the virtual machine 104, and determines, based on the identifier of the instance 5, an egress port reaching the virtual machine 105, and then obtains a corresponding routing entry based on the egress ports and the identifier of the application program A.

For example, the egress port that reaches the virtual machine 101 and that is determined by the network device 116 based on the identifier of the instance 1, the egress port that reaches the virtual machine 104 and that is determined by the network device 116 based on the identifier of the instance 4, and the egress port that reaches the virtual machine 105 and that is determined by the network device 116 based on the identifier of the instance 5 each are an egress port a connected to the network device 113. In this case, the network device 116 may generate a routing entry in the following Table 4:

TABLE 4

| Identifier of an application program | Egress port | Weight value |
|---|---|---|
| Identifier of the application program A | Egress port a | 100% |

Corresponding weight values that are obtained based on the computing capability of the virtual machine 101, the computing capability of the virtual machine 104, and the computing capability of the virtual machine 105 may be 40%, 30%, and 30%, respectively. In this case, a weight value corresponding to the egress port a is a sum of the three weight values, that is, 100%. In other words, all packets about the application program A that are from the terminal device are sent to a next-hop device, that is, the network device 113, through the port a.

For another example, the egress port that reaches the virtual machine 101 and that is determined by the network device 111 based on the identifier of the instance 1 is an egress port b, and the egress port that reaches the virtual machine 104 and that is determined by the network device 111 based on the identifier of the instance 4 and the egress port that reaches the virtual machine 105 and that is determined by the network device 111 based on the identifier of the instance 5 each are an egress port c connected to the network device 114. In this case, the network device 111 may generate a routing entry in the following Table 5:

TABLE 5

| Identifier of an application program | Egress port | Weight value |
|---|---|---|
| Identifier of the application program A | Egress port b<br>Egress port c | 40%<br>60% |

Because the egress port b can reach the virtual machine 101, a corresponding weight value of the egress port b is 40%. Because the egress port c can reach the virtual machine 104 and the virtual machine 105, a corresponding weight value of the egress port c is 30%+30%, that is, 60%. In other words, 40% of packets about the application program A that are from the terminal device are sent to the virtual machine 101 through the egress port b, and 60% of the packets are sent to the virtual machine 104 and the virtual machine 105 through the egress port c.

S304. The network device 116 receives a packet from the terminal device 121, where the packet includes the identifier of the application program A. The network device 116 finds a corresponding egress port, that is, the egress port a, based on the routing entry corresponding to the network device 116, and sends the packet to the network device 113. The network device 113 sends the packet to the network device 112, and the network device 112 sends the packet to the network device 111. The network device 111 sends the packet through the egress port b with a probability of 40%, and sends the packet through the egress port c with a probability of 60%. In this way, load balancing is implemented while the computing capabilities of the virtual machines are ensured.

Figure 3:
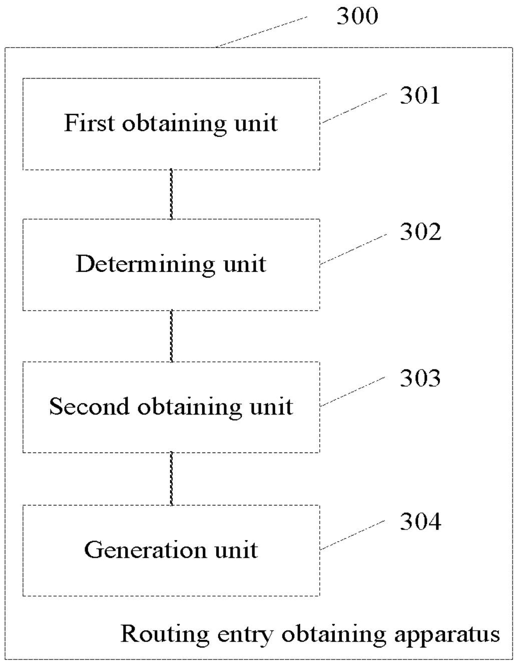
FIG. 3 is a structural block diagram of a routing entry obtaining apparatus according to an embodiment of this application.

Refer to FIG. 3. An embodiment of this application further provides a routing entry obtaining apparatus 300. The routing entry obtaining apparatus is applied to a first network device.

The routing entry obtaining apparatus 300 includes a first obtaining unit 301, a determining unit 302, a second obtaining unit 303, and a generation unit 304. The first obtaining unit 301 is configured to perform S201 in the embodiment shown in FIG. 2. The determining unit 302 is configured to perform S202 in the embodiment shown in FIG. 2. The second obtaining unit 303 is configured to perform S203 in the embodiment shown in FIG. 2. The generation unit 304 is configured to perform S204 in the embodiment shown in FIG. 2. Details are as follows. The first obtaining unit 301 is configured to obtain an identifier of an application program, a computing capability of a first apparatus running the application program, and a computing capability of a second apparatus running the application program, the determining unit 302 is configured to determine, based on the computing capability of the first apparatus and the computing capability of the second apparatus, an apparatus whose computing capability satisfies a preset condition as a target apparatus, the second obtaining unit 303 is configured to obtain an identifier of a target instance, where the identifier of the target instance is used to identify an instance of the application program run by the target apparatus, and the generation unit 304 is configured to generate a routing entry based on the identifier of the application program and the identifier of the target instance, where the routing entry includes the identifier of the application program and an egress port of the routing entry obtaining apparatus, the egress port of the routing entry obtaining apparatus is a port determined based on the identifier of the target instance, and the egress port of the routing entry obtaining apparatus is capable of communicating with a next-hop device on a path to the target apparatus.

The routing entry obtaining apparatus 300 can implement functions of the first network device in the method embodiment in FIG. 2. For specific execution steps, refer to the foregoing method embodiment. Details are not described herein again.

Figure 4:
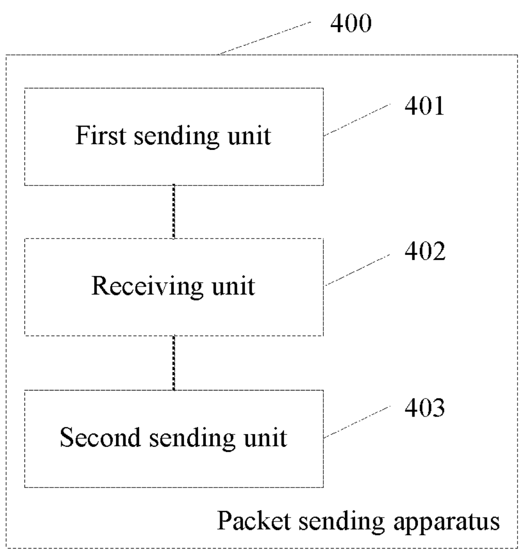
FIG. 4 is a structural block diagram of a packet sending apparatus according to an embodiment of this application.

Refer to FIG. 4. An embodiment of this application further provides a packet sending apparatus 400. The apparatus may be applied to a terminal device. The packet sending apparatus 400 can implement functions of the terminal device in the embodiment shown in FIG. 2.

The packet sending apparatus 400 includes a first sending unit 401, a receiving unit 402, and a second sending unit 403. The first sending unit 401 is configured to send an application processing request to a first device, where the application processing request includes a URL of an application program. The receiving unit 402 is configured to receive, from the first device, an identifier of the application program corresponding to the URL of the application program. The second sending unit 403 is configured to send a packet to a routing entry obtaining apparatus, where the packet includes the identifier of the application program.

The packet sending apparatus 400 can implement functions of the terminal device in the method embodiment in FIG. 2. For specific execution steps, refer to the foregoing method embodiment. Details are not described herein again.

Figure 5:
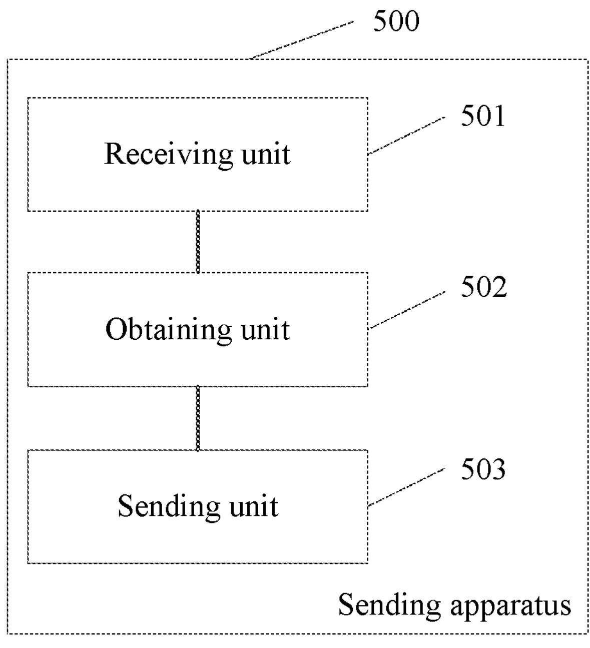
FIG. 5 is a structural block diagram of a sending apparatus according to an embodiment of this application.

Refer to FIG. 5. An embodiment of this application further provides a sending apparatus 500. The apparatus may be applied to a first device. The sending apparatus 500 can implement functions of the DNS, the LB, or the first network device in the embodiment shown in FIG. 2.

The sending apparatus 500 includes a receiving unit 501, an obtaining unit 502, and a sending unit 503.

The receiving unit 501 is configured to receive an application processing request from a terminal device, where the application processing request carries a URL of an application program. The obtaining unit 502 is configured to obtain an identifier of the application program based on the URL of the application program and a mapping relationship, where the mapping relationship includes the URL of the application program and the identifier of the application program. The sending unit 503 is configured to send the identifier of the application program to the terminal device.

The sending apparatus 500 can implement functions of the first device in the method embodiment in FIG. 2. For specific execution steps, refer to the foregoing method embodiment. Details are not described herein again.

Figure 6:
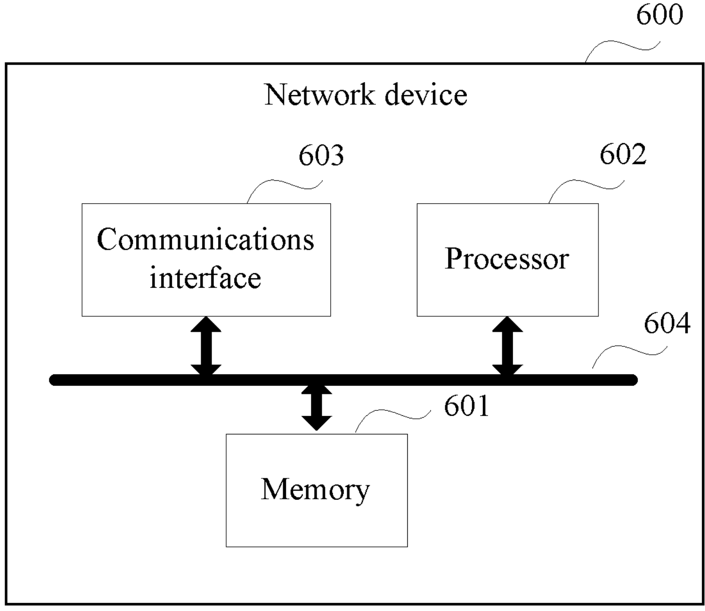
FIG. 6 is a structural block diagram of a network device according to an embodiment of this application.

Refer to FIG. 6. An embodiment of this application provides a network device 600. The network device 600 can implement functions of the first network device in the embodiments shown in FIG. 2 to FIG. 5. The network device 600 includes a memory 601, a processor 602, and a communications interface 603.

The memory 601 is configured to store instructions. When the embodiment shown in FIG. 3 is implemented and the units described in the embodiment in FIG. 3 are implemented by software, software or program code required for performing functions of the first obtaining unit 301, the determining unit 302, the second obtaining unit 303, and the generation unit 304 in FIG. 3 is stored in the memory 601.

The processor 602 is configured to execute the instructions in the memory 601 to perform the routing entry obtaining method applied to the first network device in the embodiment shown in FIG. 2.

The communications interface 603 is configured to perform communication.

The memory 601, the processor 602, and the communications interface 603 are connected to each other through a bus 604. The bus 604 may be a Peripheral Component Interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 6, but this does not mean that there is only one bus or only one type of bus.

In a specific embodiment, the processor 602 is configured to obtain an identifier of an application program, a computing capability of a first apparatus running the application program, and a computing capability of a second apparatus running the application program, determine, based on the computing capability of the first apparatus and the computing capability of the second apparatus, an apparatus whose computing capability satisfies a preset condition as a target apparatus, obtain an identifier of a target instance, where the identifier of the target instance is used to identify an instance of the application program run by the target apparatus, and generate a routing entry based on the identifier of the application program and the identifier of the target instance, where the routing entry includes the identifier of the application program and an egress port of the network device, the egress port of the network device is a port determined based on the identifier of the target instance, and the egress port of the network device is capable of communicating with a next-hop device on a path to the target apparatus. For a detailed processing process of the processor 602, refer to detailed descriptions of S202 to S204 in the embodiment shown in FIG. 2. Details are not described herein again.

The communications interface 603 is configured to receive the identifier of the application program, the computing capability of the first apparatus running the application program, and the computing capability of the second apparatus running the application program. For a specific process thereof, refer to detailed descriptions of S201 in the embodiment shown in FIG. 2. Details are not described herein again.

Figure 7:
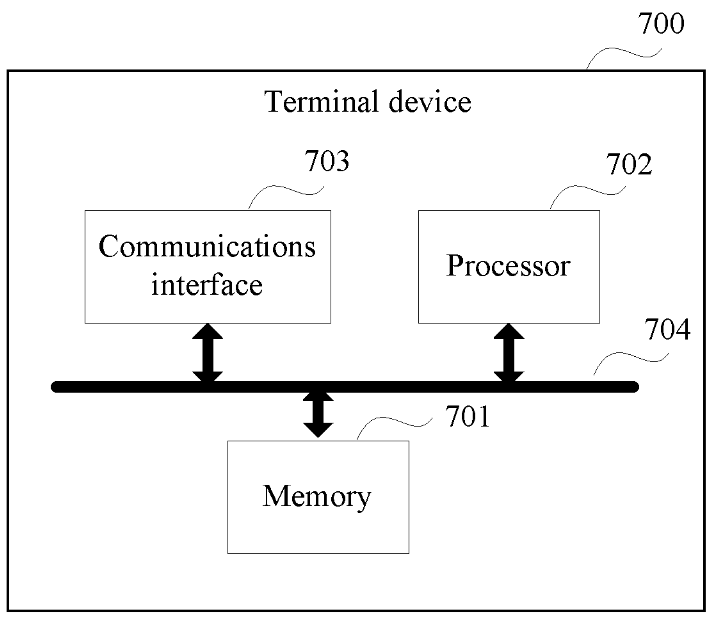
FIG. 7 is a structural block diagram of a packet sending apparatus according to an embodiment of this application.

Refer to FIG. 7. An embodiment of this application provides a terminal device 700. The terminal device 700 can implement functions of the terminal device in the embodiments shown in FIG. 2 to FIG. 5. The terminal device 700 includes a memory 701, a processor 702, and a communications interface 703.

The memory 701 is configured to store instructions. When the embodiment shown in FIG. 4 is implemented and the units described in the embodiment in FIG. 4 are implemented by software, software or program code required for performing functions of the first sending unit 401, the receiving unit 402, and the second sending unit 403 in FIG. 4 is stored in the memory 701.

The processor 702 is configured to execute the instructions in the memory 701 to perform the packet sending method applied to the terminal device in the embodiment shown in FIG. 2.

The communications interface 703 is configured to perform communication.

The memory 701, the processor 702, and the communications interface 703 are connected to each other through a bus 704. The bus 704 may be a PCI bus, an EISA bus, or the like. The bus may be classified into an address bus, a data bus, a control bus, and the like. For ease of representation, only one thick line is used to represent the bus in FIG. 7, but this does not mean that there is only one bus or only one type of bus.

In a specific embodiment, the communications interface 703 is configured to send an application processing request to a first device, where the application processing request includes a URL of an application program, receive, from the first device, an identifier of the application program corresponding to the URL of the application program, and send a packet to a first network device, where the packet includes the identifier of the application program. For a specific process thereof, refer to detailed descriptions in the embodiment shown in FIG. 2. Details are not described herein again.

Figure 8:
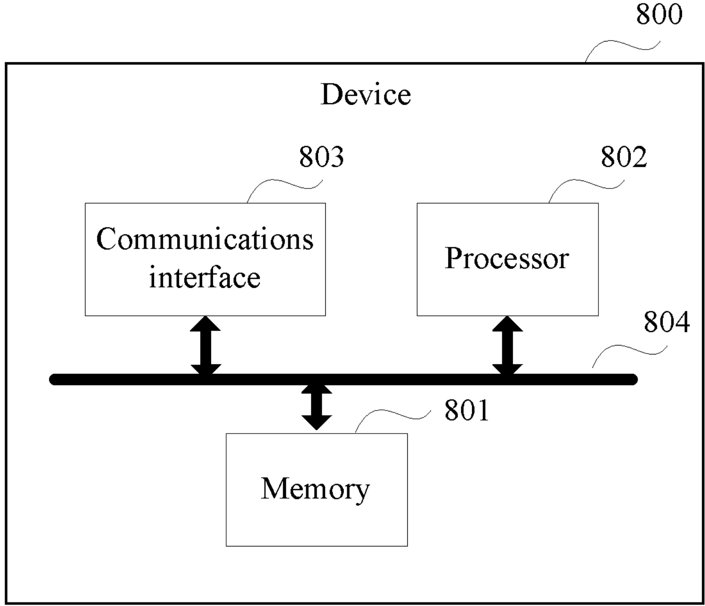
FIG. 8 is a structural block diagram of a sending apparatus according to an embodiment of this application.

Refer to FIG. 8. An embodiment of this application provides a device 800. The device 800 can implement functions of the first device in the embodiments shown in FIG. 2 to FIG. 5. The device 800 includes a memory 801, a processor 802, and a communications interface 803.

The memory 801 is configured to store instructions. When the embodiment shown in FIG. 5 is implemented and the units described in the embodiment in FIG. 5 are implemented by software, software or program code required for performing functions of the receiving unit 501, the obtaining unit 502, and the sending unit 503 in FIG. 5 is stored in the memory 801.

The processor 802 is configured to execute the instructions in the memory 801 to perform the sending method applied to the first device in the embodiment shown in FIG. 2.

The communications interface 803 is configured to perform communication.

The memory 801, the processor 802, and the communications interface 803 are connected to each other through a bus 804. The bus 804 may be a PCI bus, an EISA bus, or the like. The bus may be classified into an address bus, a data bus, a control bus, and the like. For ease of representation, only one thick line is used to represent the bus in FIG. 8, but this does not mean that there is only one bus or only one type of bus.

In a specific embodiment, the processor 802 is configured to obtain an identifier of an application program based on a URL of the application program and a mapping relationship, where the mapping relationship includes the URL of the application program and the identifier of the application program. The communications interface 803 is configured to send an application processing request to the first device, where the application processing request includes the URL of the application program, receive, from the first device, the identifier of the application program corresponding to the URL of the application program, and send a packet to a first network device, where the packet includes the identifier of the application program. For a specific process thereof, refer to detailed descriptions in the embodiment shown in FIG. 2. Details are not described herein again.

The memory 601, the memory 701, and the memory 801 each may be a RAM, a flash memory, a read-only memory (ROM), an erasable programmable ROM (EPROM), an electrically EPROM (EEPROM), a register, a hard disk, a removable hard disk, a compact-disc (CD) ROM (CD-ROM), or any other form of storage medium known to persons skilled in the art.

The processor 602, the processor 702, and the processor 802 may be, for example, a CPU, a general-purpose processor, a digital signal processor (DSP), or an application-specific integrated circuit (ASIC), a field-programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The communications interface 603, the communications interface 703, and the communications interface 803 each may be an interface card such as the Ethernet interface or an asynchronous transfer mode (ATM) interface.

An embodiment of this application further provides a network system. The network system includes a first network device and a terminal device. The first network device in the network system is the routing entry obtaining apparatus 300 shown in FIG. 3, and the terminal device is the packet sending apparatus 400 in the embodiment shown in FIG. 4.

Optionally, the network system may further include a first device, and the first device may be the sending apparatus 500 in the embodiment shown in FIG. 5.

An embodiment of this application further provides a computer-readable storage medium, including instructions. When the instructions are run on a computer, the computer is enabled to perform the routing entry obtaining method applied to the network device 600.

An embodiment of this application further provides a computer-readable storage medium, including instructions. When the instructions are run on a computer, the computer is enabled to perform the packet sending method applied to the terminal device 700.

An embodiment of this application further provides a computer-readable storage medium, including instructions. When the instructions are run on a computer, the computer is enabled to perform the sending method applied to the device 800.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical module division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be obtained depending on an actual requirement to achieve the objectives of the solutions of the embodiments.

In addition, module units in the embodiments of this application may be integrated into one processing unit, or each of the units may exist alone physically, or two or more units are integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a computer device (which may be a PC, a server, or a network device) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

Persons skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the present disclosure are further described in detail in the foregoing specific implementations. It should be understood that the foregoing descriptions are merely specific implementations of the present disclosure.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method implemented by a network device, wherein the method comprises:

receiving, by the network device and from a first apparatus running an application program, a first Border Gateway Protocol (BGP) packet comprising a first computing capability of the first apparatus and an identifier of the application program;

receiving, by the network device and from a second apparatus running the application program, a second BGP packet comprising a second computing capability of the second apparatus and the identifier of the application program;

selecting, according to the identifier of the application program, the first computing capability, and the second computing capability, at least one of the first apparatus or the second apparatus as a target apparatus by selecting, based on a comparison of the first computing capability and the second computing capability to a computing capability threshold, the at least one of the first apparatus or the second apparatus as the target apparatus, wherein when the first computing capability and the second computing capability comprise loads, selecting the at least one of the first apparatus or the second apparatus comprises selecting, based on one of the loads being less than a preset load threshold, the at least one of the first apparatus or the second apparatus, wherein when the first computing capability and the second computing capability comprise quantities of CPU cores, selecting the at least one of the first apparatus or the second apparatus comprises selecting, based on one of the quantities of CPU cores being greater than a preset quantity of cores threshold, the at least one of the first apparatus or the second apparatus, and wherein when the first computing capability and the second computing capability comprise sizes of random-access memories (RAMs), selecting the at least one of the first apparatus or the second apparatus comprises selecting, based on one of the sizes of RAMs being greater than a preset quantity of RAM, the at least one of the first apparatus or the second apparatus; and identifying an egress port configured to communicate with a next-hop device on a path to the target apparatus.

2. The method of claim 1, further comprising receiving, from a virtual router, a third packet comprising the identifier of the application program, the first computing capability, and the second computing capability.

3. The method of claim 2, wherein the third packet is a third BGP packet.

4. The method of claim 1, further comprising receiving, from a terminal device, a fourth packet comprising the identifier of the application program, wherein identifying the egress port comprises obtaining, based on the identifier of the application program and a routing entry, the egress port, and wherein the method further comprises sending the fourth packet through the egress port.

5. The method of claim 1, wherein selecting the at least one of the first apparatus or the second apparatus as the target apparatus comprises selecting, based on the first computing capability or the second computing capability meeting a preset condition, the at least one of the first apparatus or the second apparatus as the target apparatus.

6. The method of claim 5, further comprising:

receiving a routing entry that comprises a network performance of the path;

obtaining the network performance; and identifying, based on the network performance, the next-hop device.

7. The method of claim 6, further comprising receiving, from a terminal device, a fifth packet comprising the identifier of the application program and a network performance requirement of the application program, wherein selecting the at least one of the first apparatus or the second apparatus as the target apparatus comprises selecting, based on the identifier of the application program, the network performance matching the network performance requirement, and the routing entry, the at least one of the first apparatus or the second apparatus as the target apparatus, and wherein the method further comprises sending the fifth packet through the egress port.

8. The method of claim 1, further comprising obtaining a routing entry comprising a weight value identifying a probability of sending a sixth packet to the target apparatus through the egress port.

9. The method of claim 1, further comprising communicating, through the egress port, with the target apparatus.

10. The method of claim 1, wherein selecting the at least one of the first apparatus or the second apparatus as the target apparatus comprises selecting, based on ranking the first computing capability and the second computing capability, the at least one of the first apparatus or the second apparatus as the target apparatus having a highest rank.

11. An apparatus applied to a network device, wherein the apparatus comprises:

a memory configured to store instructions; and one or more processors coupled to the memory and configured to execute the instructions to cause the apparatus to:

receive, from a first apparatus running an application program, a first Border Gateway Protocol (BGP) packet comprising a first computing capability of the first apparatus and an identifier of the application program;

receive, from a second apparatus running the application program, a second BGP packet comprising a second computing capability of the second apparatus and the identifier of the application program;

select, according to the identifier of the application program, the first computing capability, and the second computing capability, at least one of the first apparatus or the second apparatus as a target apparatus by selecting, based on a comparison of the first computing capability and the second computing capability to a computing capability threshold, the at least one of the first apparatus or the second apparatus as the target apparatus, wherein when the first computing capability and the second computing capability comprise loads, selecting the at least one of the first apparatus or the second apparatus comprises selecting, based on one of the loads being less than a preset load threshold, the at least one of the first apparatus or the second apparatus, wherein when the first computing capability and the second computing capability comprise quantities of CPU cores, selecting the at least one of the first apparatus or the second apparatus comprises selecting, based on one of the quantities of CPU cores being greater than a preset quantity of cores threshold, the at least one of the first apparatus or the second apparatus, and wherein when the first computing capability and the second computing capability comprise sizes of random-access memories (RAMs), selecting the at least one of the first apparatus or the second apparatus comprises selecting, based on one of the sizes of RAMs being greater than a preset quantity of RAM, the at least one of the first apparatus or the second apparatus; and identify an egress port configured to communicate with a next-hop device on a path to the target apparatus.

12. The apparatus of claim 11, wherein the one or more processors are further configured to execute the instructions to cause the apparatus to receive, from a virtual router, a third packet comprising the identifier of the application program, the first computing capability, and the second computing capability.

13. The apparatus of claim 12, wherein the third packet is a third BGP packet.

14. The apparatus of claim 11, wherein the one or more processors are further configured to execute the instructions to cause the apparatus to receive, from a terminal device, a fourth packet comprising the identifier of the application program, wherein identifying the egress port comprises obtaining, based on the identifier of the application program and a routing entry, the egress port, and wherein the one or more processors are further configured to execute the instructions to cause the apparatus to send the fourth packet through the egress port.

15. The apparatus of claim 11, wherein the one or more processors are further configured to execute the instructions to cause the apparatus to select, based on the first computing capability or the second computing capability meeting a preset condition, the at least one of the first apparatus or the second apparatus as the target apparatus.

16. The apparatus of claim 15, wherein the one or more processors are further configured to execute the instructions to cause the apparatus to:

obtain a routing entry comprising a network performance of the path;

obtain the network performance; and identify, based on the network performance, the next-hop device.

17. The apparatus of claim 16, wherein the one or more processors are further configured to execute the instructions to cause the apparatus to receive, from a terminal device, a fifth packet comprising the identifier of the application program and a network performance requirement of the application program, wherein selecting the at least one of the first apparatus or the second apparatus as the target apparatus comprises selecting, based on the identifier of the application program, the network performance matching the network performance requirement, and the routing entry, the at least one of the first apparatus or the second apparatus as the target apparatus, and wherein the one or more processors are further configured to execute the instructions to cause the apparatus to send the fifth packet through the egress port.

18. The apparatus of claim 11, wherein the one or more processors are further configured to execute the instructions to cause the apparatus to obtain a routing entry comprising a weight value identifying a probability of sending a sixth packet to the target apparatus through the egress port.

19. A method implemented by a network device, wherein the method comprises:

receiving, by the network device and from a first apparatus running an application program, a first Border Gateway Protocol (BGP) packet comprising a first computing capability of the first apparatus and an identifier of the application program;

receiving, by the network device and from a second apparatus running the application program, a second BGP packet comprising a second computing capability of the second apparatus and the identifier of the application program;

selecting, according to the identifier of the application program, the first computing capability, and the second computing capability, at least one of the first apparatus or the second apparatus as a target apparatus by selecting, based on a comparison of the first computing capability and the second computing capability to a computing capability threshold, the at least one of the first apparatus or the second apparatus as the target apparatus, wherein when the first computing capability and the second computing capability comprise loads, selecting the at least one of the first apparatus or the second apparatus comprises selecting, based on one of the loads being less than a preset load threshold, the at least one of the first apparatus or the second apparatus, wherein when the first computing capability and the second computing capability comprise quantities of CPU cores, selecting the at least one of the first apparatus or the second apparatus comprises selecting, based on one of the quantities of CPU cores being greater than a preset quantity of cores threshold, the at least one of the first apparatus or the second apparatus, and wherein when the first computing capability and the second computing capability comprise sizes of random-access memories (RAMs), selecting the at least one of the first apparatus or the second apparatus comprises selecting, based on one of the sizes of RAMs being greater than a preset quantity of RAM, the at least one of the first apparatus or the second apparatus;

identifying an egress port configured to communicate with a next-hop device on a path to the target apparatus; and communicating, through the egress port, with the target apparatus.

20. The method of claim 19, further comprising receiving, from a virtual router, a third packet comprising the identifier of the application program, the first computing capability, and the second computing capability.

21. The method of claim 20, wherein the third packet is a third BGP packet.

* * * * *